(12) United States Patent
Ma

(10) Patent No.: US 9,416,839 B2
(45) Date of Patent: Aug. 16, 2016

(54) BUSHINGS AND BUMPERS BASED UPON NPR (NEGATIVE POISSON'S RATIO) STRUCTURES

(71) Applicant: MKP Structural Design Associates, Inc., Dexter, MI (US)

(72) Inventor: Zheng-Dong Ma, Ann Arbor, MI (US)

(73) Assignee: MKP Structural Design Associates, Inc., Dexter, MI (US)

( * ) Notice: Subject to any disclaimer, the term of this patent is extended or adjusted under 35 U.S.C. 154(b) by 475 days.

(21) Appl. No.: 13/940,845

(22) Filed: Jul. 12, 2013

(65) Prior Publication Data

US 2014/0017422 A1    Jan. 16, 2014

Related U.S. Application Data

(60) Provisional application No. 61/670,899, filed on Jul. 12, 2012.

(51) Int. Cl.
*F16F 7/12* (2006.01)
*F16F 1/36* (2006.01)

(52) U.S. Cl.
CPC .............. *F16F 7/121* (2013.01); *F16F 1/3605* (2013.01); *Y10T 428/13* (2015.01)

(58) Field of Classification Search
CPC ....... F16F 7/121; F16F 1/3605; Y10T 428/13
See application file for complete search history.

(56) References Cited

U.S. PATENT DOCUMENTS

| 7,160,621 | B2 | 1/2007 | Chaudhari et al. | |
|---|---|---|---|---|
| 7,910,193 | B2 | 3/2011 | Ma | |
| 8,544,515 | B2 | 10/2013 | Ma et al. | |
| 2005/0287371 | A1* | 12/2005 | Chaudhari | B60R 19/18 428/412 |
| 2013/0322955 | A1 | 12/2013 | Ma | |

* cited by examiner

*Primary Examiner* — Michael C Miggins
(74) *Attorney, Agent, or Firm* — Dinsmore & Shohl LLP

(57) ABSTRACT

NPR (negative Poisson's ratio) components for vehicle and other applications generally assume a tubular structure defining an axis, a length and a cross section. The structure is composed of a plurality of nested, double-V unit cells, each unit cell comprising a pair of side points A and B defining a width, a first pair of tensile members interconnecting points A and B and intersecting at a point C forming a first V shape, a second pair of stuffer members interconnecting points A and B and intersecting at a point D forming a second V shape. The unit cells are connected in a first direction with the point B of one cell being connected to point A of an adjoining cell, and so on, until completing a continuous band. The unit cells are further connected in a second direction with the point D of one cell being connected to point C of an adjoining cell. In one embodiment, the bands are stacked radially outwardly from the axis to form a bushing. In accordance with a second embodiment, the bands are stacked lengthwise along the structure to form a joust bumper.

21 Claims, 13 Drawing Sheets

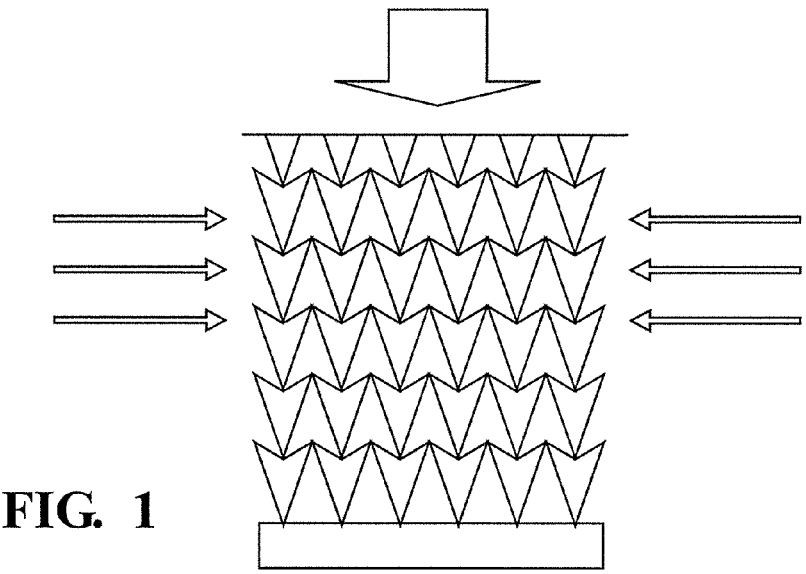
FIG. 1
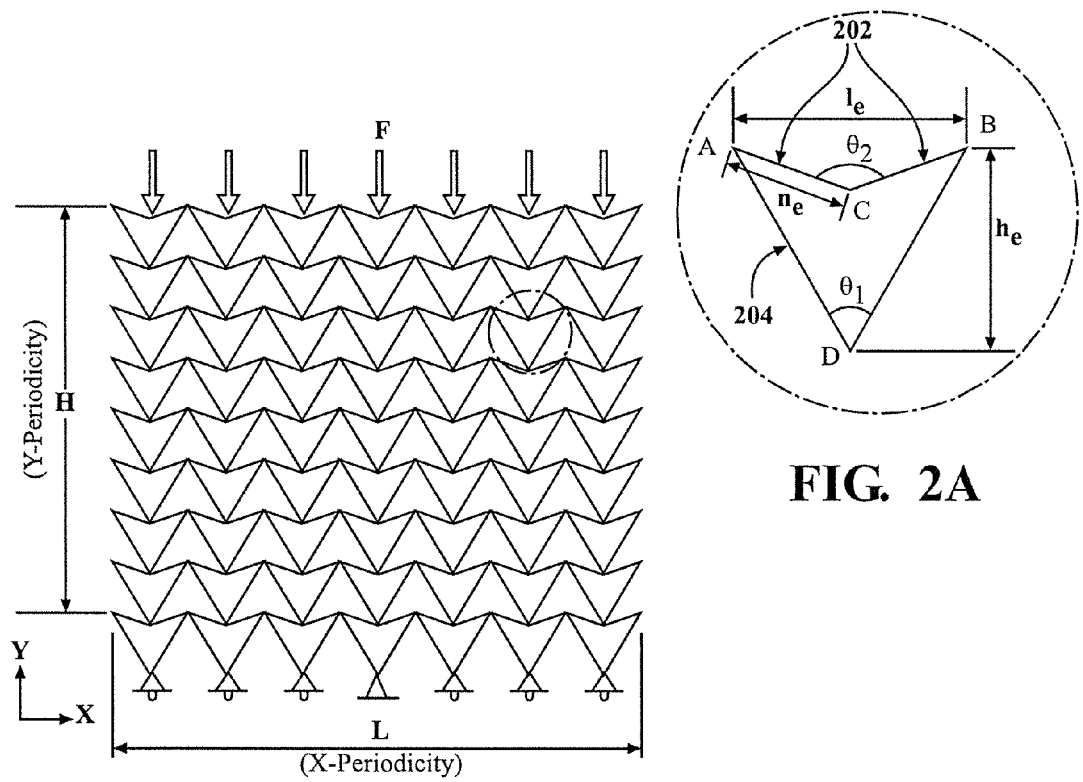
FIG. 2A
FIG. 2

N = 20
Stuffer 1 = 1.5mm
Stuffer 2 = 2.0mm
Tendons = 1.0mm

N = 20
Stuffer 1 = 1.016mm
Stuffer 2 = 1.27mm
Tendons = 0.5mm

N = 24
Stuffer 1 = 1.016mm
Stuffer 2 = 1.27mm
Tendons = 0.5mm

BUSHINGS AND BUMPERS BASED UPON NPR (NEGATIVE POISSON'S RATIO) STRUCTURES

REFERENCE TO RELATED APPLICATION

This application claims priority to U.S. Provisional Patent Application Ser. No. 61/670,899, filed Jul. 12, 2012, the entire content of which is incorporated herein by reference.

FIELD OF THE INVENTION

This invention relates generally to auxetic materials, which have a negative Poisson's ratio (NPR), and, in particular, to the replacement of bushings, jounce bumpers (body and engine) mounts, springs, coiling springs, and other devices using NPR alternatives.

BACKGROUND OF THE INVENTION

Poisson's ratio (v), named after Simeon Poisson, is the ratio of the relative contraction strain, or transverse strain (normal to the applied load), divided by the relative extension strain, or axial strain (in the direction of the applied load). Some materials, called auxetic materials, have a negative Poisson's ratio (NPR). If such materials are stretched (or compressed) in one direction, they become thicker (or thinner) in perpendicular directions.

NPR structures can react differently under applied loads. FIG. 1 illustrates a reactive shrinking mechanism, obtained through a topology optimization process. The unique property of this structure is that it will shrink in two directions if compressed in one direction. FIG. 1 illustrates that when the structure is under a compressive load on the top of the structure, more material is gathered together under the load so that the structure becomes stiffer and stronger in the local area to resist against the load.

FIG. 2 illustrates a negative Poisson's ratio (NPR) structure having the unique property that it will shrink along all directions when compressed in one direction. A nonlinear finite element method has been developed with a multi-step linearized analysis method to predict nonlinear behavior of this material. Effective material properties, such as Young's modulus, Poisson's ratio, material density, and load-bearing efficiency can be calculated with consideration of the geometric nonlinear effect for any large load amplitudes.

The two-dimensional structures of FIGS. 1 and 2 are composed of a plurality of nested "V-type" unit cells, each unit cell comprising a pair of side points A and B defining a width, 1, a first pair of straight or curved members 202 with constant or variable cross section interconnecting points A and B and intersecting at a point C forming a first V shape defining the "tensile" material, a second pair of straight or curved members 204 with constant or variable cross section interconnecting points A and B and intersecting at a point D forming a second V shape defining the "staffer" material. The unit cells are then connected in rows with the point B of one cell being connected to point A of an adjoining cell until completing a band of unit cells, the unit cells being further connected in stacked columns with the point D of one cell being connected to point C of an adjoining cell.

FIG. 3A illustrates the structure of FIG. 2 with $\Theta_1=60°$ and $\Theta_2=120°$, and FIG. 3B illustrates the structure of FIG. 2 with $\Theta_1=30°$ and $\Theta_2=60°$. FIG. 3 also illustrates the predicted deformation shapes and effective material properties of the two designs, in which, v denotes the effective Poisson's ratio and E is the effective Young's modulus. In FIGS. 3A and B, dashed lines represent the undeformed shape, and solid lines represent the deformed shape. Comparing FIGS. 3A and B, it is seen that the deformation shapes of the two designs are very different under the same loading condition. The effective Poisson's ratio changed from v=−0.96 to v=−7.4 from design #1 to design #2, while the effective Young's modulus changed from E=1.4e3 MPa to E=2.7e3 MPa. This suggests that the second design is better suited to problems that require a large absolute value of NPR and a higher Young's modulus.

FIG. 4 illustrates what happens when localized pressure is applied to an NPR structure. The original structure configuration is shown in dashed lines, and solid lines illustrate the deformed structure obtained from the simulation. As shown in the Figure, the surrounding material is concentrated into the local area due to the negative Poisson's ratio effect as the force is applied. Therefore the material becomes stiffer and stronger in the local area.

NPR materials have attracted significant interest due to their unique behaviors. Unlike conventional materials, a NPR material may shrink when compressed along a perpendicular direction. One result of this behavior is that the material can concentrate itself under the compressive load to better resist the load. Thus, a NPR material becomes stiffer and stronger as the amplitude of the load increases. It has also been found that NPR can improve material/structural properties, including enhanced thermal/shock resistance, fracture toughness, indentation resistance and shear modulus.

Auxetic and NPR structures have been used in a variety of applications. According to U.S. Pat. No. 7,160,621, an automotive energy absorber comprises a plurality of auxetic structures wherein the auxetic structures are of size greater than about 1 mm. The article also comprises at least one cell boundary that is structurally coupled to the auxetic structures. The cell boundary is configured to resist a deformation of the auxetic structures.

There are many other energy absorbing and/or vibration dampening devices, in vehicles and elsewhere, including bushings and joust bumpers. Bushings are particularly important in that they are widely prevalent in chassis and suspension systems. FIG. 5A illustrates typical bushing locations in a vehicular suspension system, and FIG. 5B illustrates typical bushing locations in a vehicle chassis.

The advantages of bushings are many: they connect parts with needed compliance; providing isolation from high frequency shock and jolts of the road; dampen the vibration energy transmitted through the bushing, and reduce noise. Disadvantages of current bushings include the following: they may adversely affect a vehicle's handling and steering characteristics; loss of camber control; front deflection steer; rear deflection and torque steer, and they may adversely affect accuracy of the dynamic simulation.

The vast majority of existing bushings are made of rubber, urethane or nylon, each being a nonlinear viscoelastic material that exhibits displacement-dependent stiffness, relaxation under constant load, and hysteresis response. The force-displacement relationship is nonlinear, frequency dependent, and loading history dependent. Rubber bushings are inexpensive to manufacture. While they provide decent isolation, the larger deflection may adversely affect handling and steering characteristics. Urethane bushings are harder and provide less deflection and better handling and steering performance. However, urethane bushings offer little ability to absorb rotational shear. Nylon bushings and inserts are relatively inexpensive, but require sleeves machined to tight tolerances.

SUMMARY OF THE INVENTION

This invention improves upon the existing art through the use of NPR (negative Poisson's ratio) structures to produce various components for vehicle and other applications, including, but not limited to bushings, mounts, and jounce bumpers. The potential advantages of these NPR replacements are many, including lighter weight, improved load-stiffening and vehicle dynamics; and more stable and predictable behavior. NPR-based components more broadly enable function-oriented designs, meaning that behavior may be tailored to provide highly non-linear response characteristics; for example, different dynamic characteristics along different axes or directions.

An NPR component according to the invention generally assumes a tubular structure defining an axis, a length and a cross section. The structure is composed of a plurality of nested, double-V unit cells, each unit cell comprising a pair of side points A and B defining a width, a first pair of tensile members interconnecting points A and B and intersecting at a point C forming a first V shape, a second pair of stuffer members interconnecting points A and B and intersecting at a point D forming a second V shape. The unit cells are connected in a first direction with the point B of one cell being connected to point A of an adjoining cell, and so on, until completing a continuous band. The unit cells are further connected in a second direction with the point D of one cell being connected to point C of an adjoining cell. In one embodiment, the bands are stacked radially outwardly from the axis to form a bushing. In accordance with a second embodiment, the bands are stacked lengthwise along the structure to form a joust bumper.

The tensile members, and or stuffer members, may be straight or curved, and either or both may have a constant or variable cross section. The tensile and stuffer members may be composed of the same or different materials. The tensile members may more flexible than the stuffer members, and may form part of one or more continuous sheets. If the tensile and stuffer members are composed of the same material, the component may be molded or extruded.

The plurality of nested, double-V cells may be attached to inner or outer on-axis cylindrical sleeves as part of a bushing, for example. In both bushing and bumper configurations, the plurality of nested, double-V cells are attached to an outer, cup-shaped receptacle. The cross section of the component may be circular or polygonal having an even number of sides.

With the number of unit cells within a band of unit cells being defined as periodicity, the periodicity is varied in accordance with an application. With the unit cells within a band of unit cells defining a height, the height may be the same or variable from band to band. The first or second V-shapes within at least some unit cells may define different angles. The stuffer members, tensile members, or both, may be constructed from metals, ceramics, fiber-reinforced composite materials, polymer matrix materials, or plastics. Some embodiments may include a foam or other filler material between the stuffer and tensile members.

BRIEF DESCRIPTION OF THE DRAWINGS

FIG. 1 illustrates a reactive shrinking mechanism, obtained through a topology optimization process;

FIG. 2 illustrates a particular negative Poisson ratio (NPR) structure;

DETAILED DESCRIPTION OF THE INVENTION

This invention resides in the use of NPR (negative Poisson's ratio) materials to produce various components for vehicle and other applications, including, but not limited to bushings, mounts, and jounce bumpers. The potential advantages of NPR replacements are many. Compared to the state-of-the-art rubber parts (bushings, mounts, jounce bumpers), they are: potentially half weight; improved load-stiffening characteristics; improved vehicle dynamics; and more stable and predictable behavior. Compared to the state-of-the-art urethane parts, NPR parts offer lighter weight as well as better vibration isolation and impact resistance while allowing rotational stiffness/flexibility and different dynamic characteristics along different directions. Compared to the state-of-the-art nylon parts, NPR devices are lighter weight and eliminate the need for separate machined bearings, thereby lower manufacturing costs. Regardless of material, NPR components enable function-oriented designs, meaning that behavior may be tailored to provide highly non-linear response characteristics; for example, different dynamic characteristics along different axes or directions.

Figure 3A:
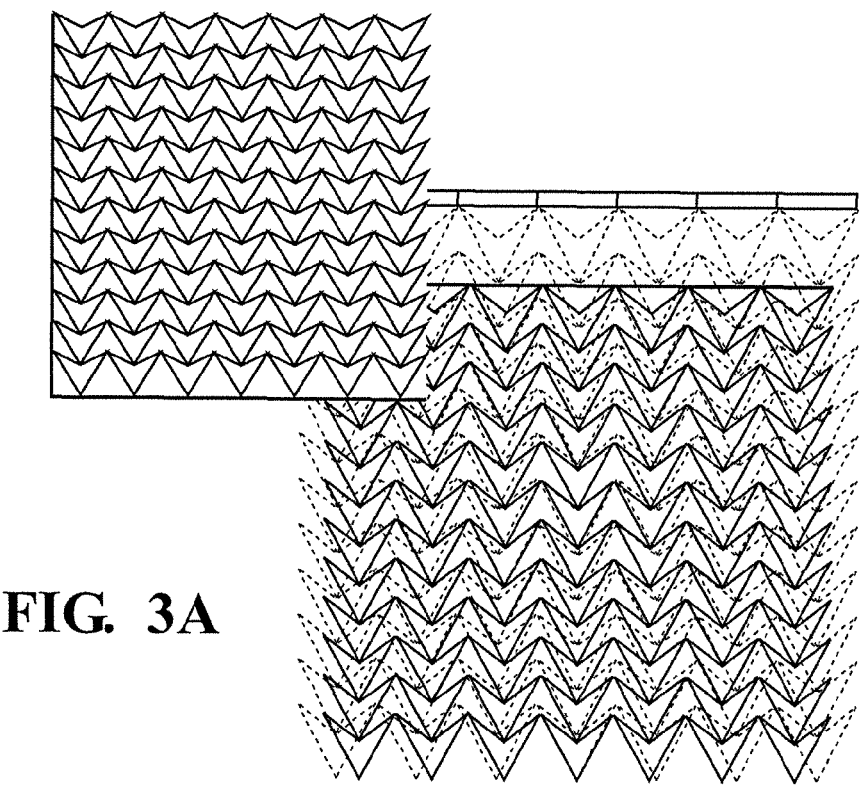
FIG. 3A illustrates the material of FIG. 2 with $\Theta_1=60'$ and $\Theta_2=120°$.
Figure 3B:
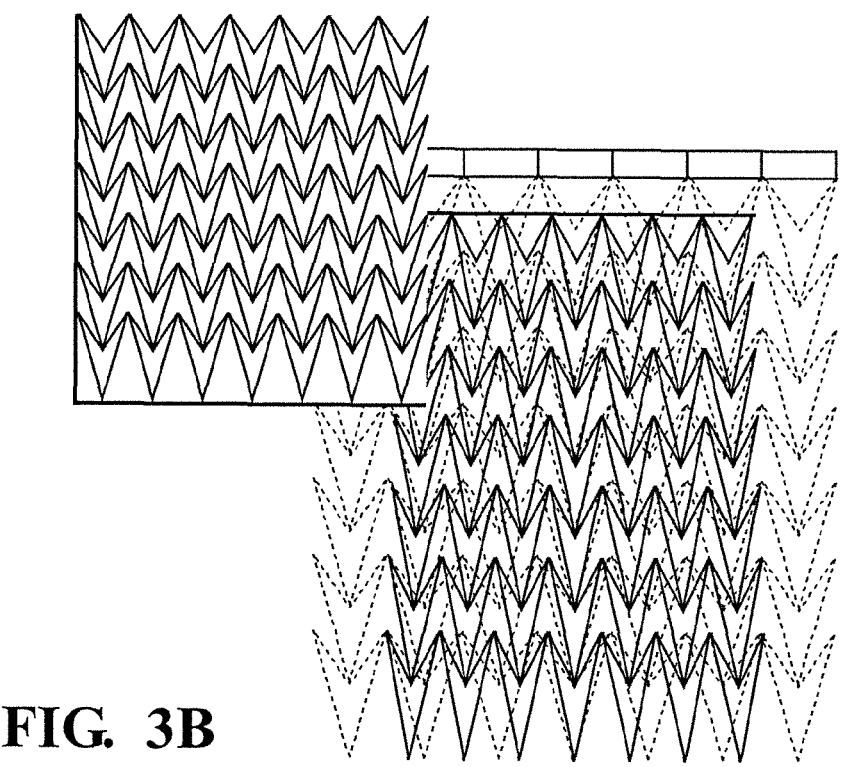
FIG. 3B illustrates the material of FIG. 2 with $\Theta_1=30'$ and $\Theta_2=60°$.
Figure 4:
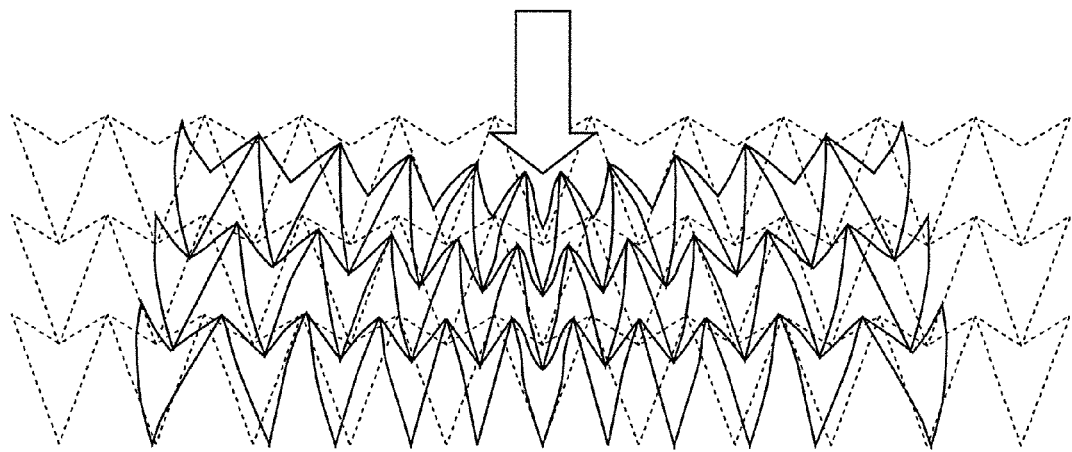
FIG. 4 illustrates how an NPR structure can be used in a load-bearing application.
Figure 5A:
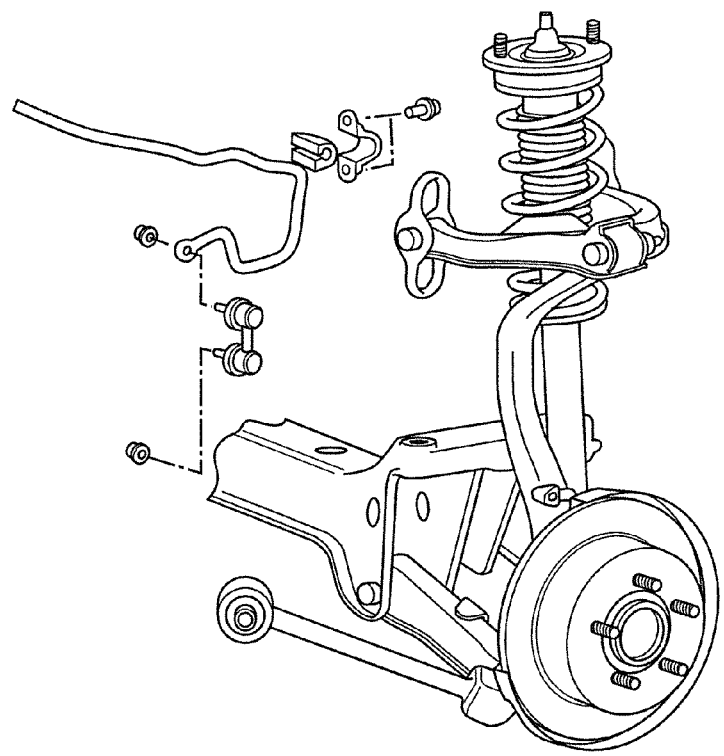
FIG. 5A illustrates typical bushing locations in a vehicular suspension system.
Figure 5B:
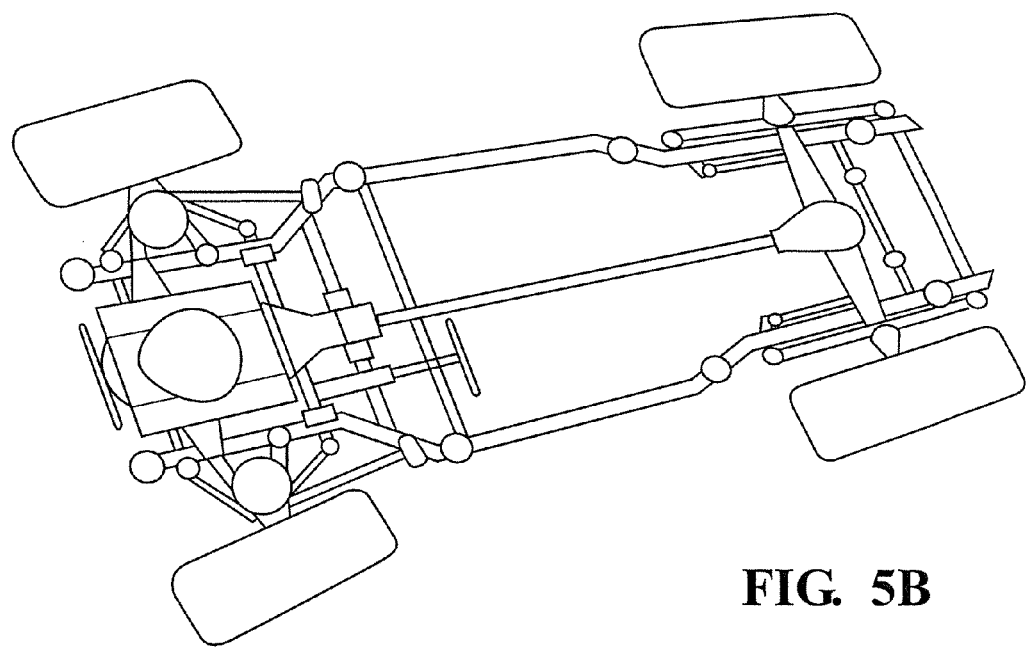
FIG. 5B illustrates typical bushing locations in a vehicle chassis.
Figure 6A:
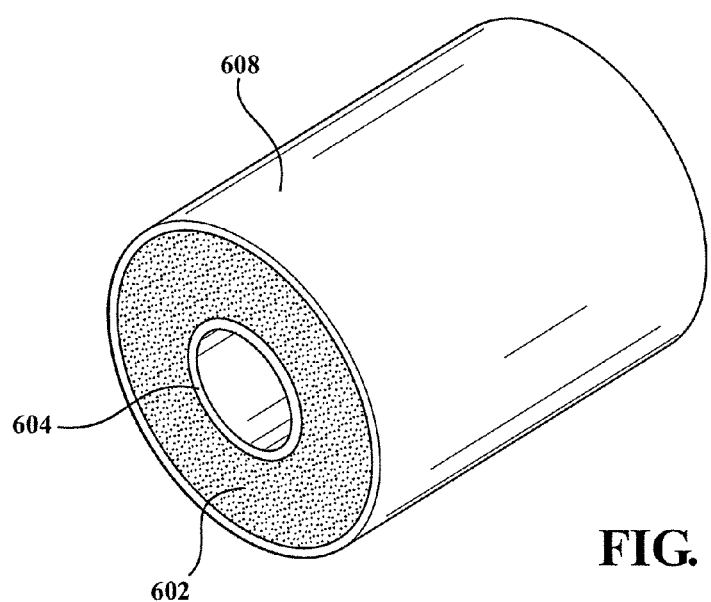
FIG. 6A depicts one type of bushing to which the invention is applicable.
Figure 6B:
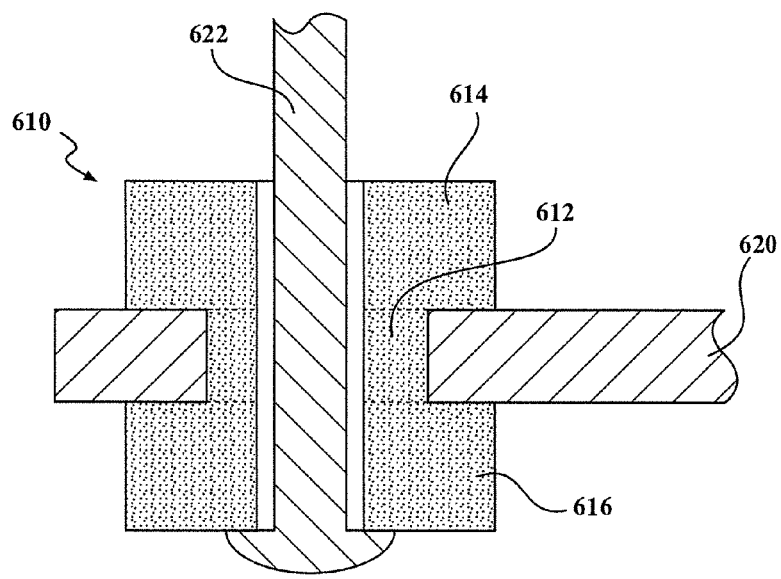
FIG. 6B shows another type of bushing to which the invention is applicable.
Figure 6C:
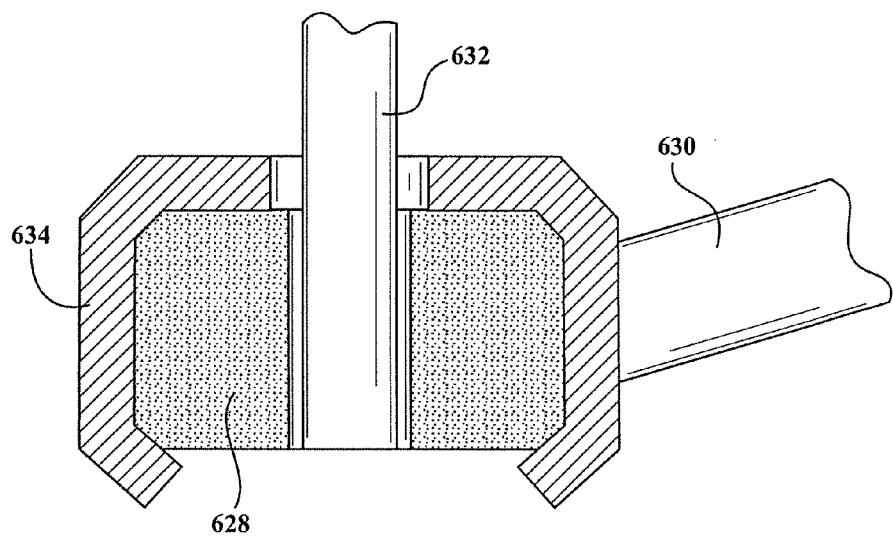
FIG. 6C depicts yet a further type of bushing to which the invention is applicable.

FIG. 6A depicts one type of bushing to which the invention is applicable. In this design, the existing cylindrical elastomeric/polymeric material 602 is bonded to inner/outer rigid, typically metallic sleeves 604, 608, and it is the material 602 which would be replaced with an NPR counterpart as described below. FIG. 6B shows another type of bushing 610 to which the invention is applicable, wherein a rod 622 moves relative to a plate 620. In this case some or all of the insert may be replaced with an NPR structure. For example, cylindrical section 612 may be NPR, bonded to end pieces 614, 616, which may be rigid or resilient FIG. 6C depicts yet a further type of bushing to which the invention is applicable. In this case the replaced insert 628 is at least partially contained within a cup-shaped housing 634 coupled to rod 630, enabling dampened movement between rods 630, 632. The applications shown in FIG. 6 are by no means exhaustive, as the physical configuration may be varied through appropriate engineering modification, particularly when function-oriented design is possible.

Figure 7C:
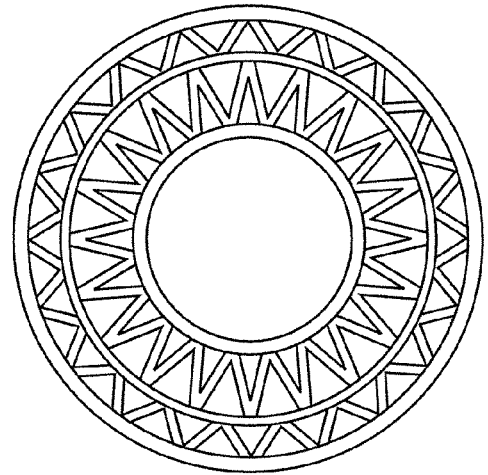
FIG. 7C is a drawing of a 2-layer NPR bushing structure wherein the number of unit cells is 20, but with different stuffer/tendon dimensions compared to FIG. 7B.
Figure 7B:
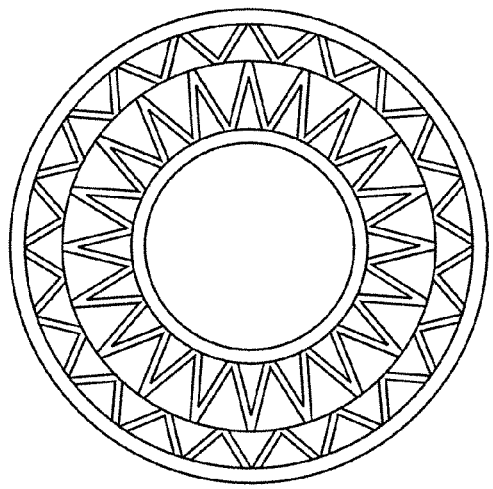
FIG. 7B is a drawing of a 2-layer NPR bushing structure wherein the number of unit cells is 20 and the stuffer/tendon dimensions are in mm.
Figure 7A:
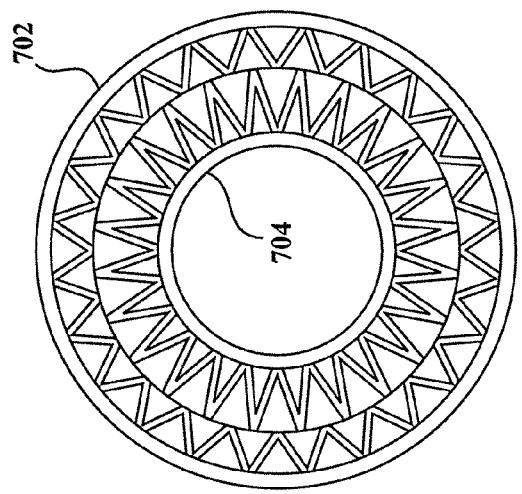
FIG. 7A is a drawing of a 2-layer NPR bushing structure wherein the number of unit cells is 24 and the stuffer/tendon dimensions are in mm.

FIGS. 7A-C illustrate slightly different NPR bushing configurations constructed in accordance with the invention. In these drawings, the bands of nested V cells are stacked radially outwardly, having a variable, desired length perpendicular to the plane of the paper. The outer and inner rings 702, 704 represent rigid sleeves of metal, ceramic, plastic or other suitable material. The stuffers may likewise be composed of metal, ceramic, rubbers, plastic, whereas the bands of tendon material may be more flexible, and may be made of natural or synthetic rubber or other resilient or deformable materials. In other embodiments, the stuffer and tendon materials may be the same and, indeed, the structures may be extruded. Depending upon the application, the stuffer and/or tendon members may be solid or hollow rods or tubes; flat or curved plates or strips; or U-shaped, T-shaped, V-shaped or I-shaped beams.

FIGS. 7A is a drawing of a 2-layer NPR bushing structure wherein the number of unit cells is 24 and the stuffer/tendon dimensions are in mm; FIGS. 7B is a drawing of a 2-layer NPR bushing structure wherein the number of unit cells is 20 and the stuffer/tendon dimensions are in mm; and FIGS. 7C is a drawing of a 2-layer NPR bushing structure wherein the number of unit cells is 20, but with different stuffer/tendon dimensions compared to FIG. 7B. Note that single, double, or multiple layered structure can be considered.

Figure 8:
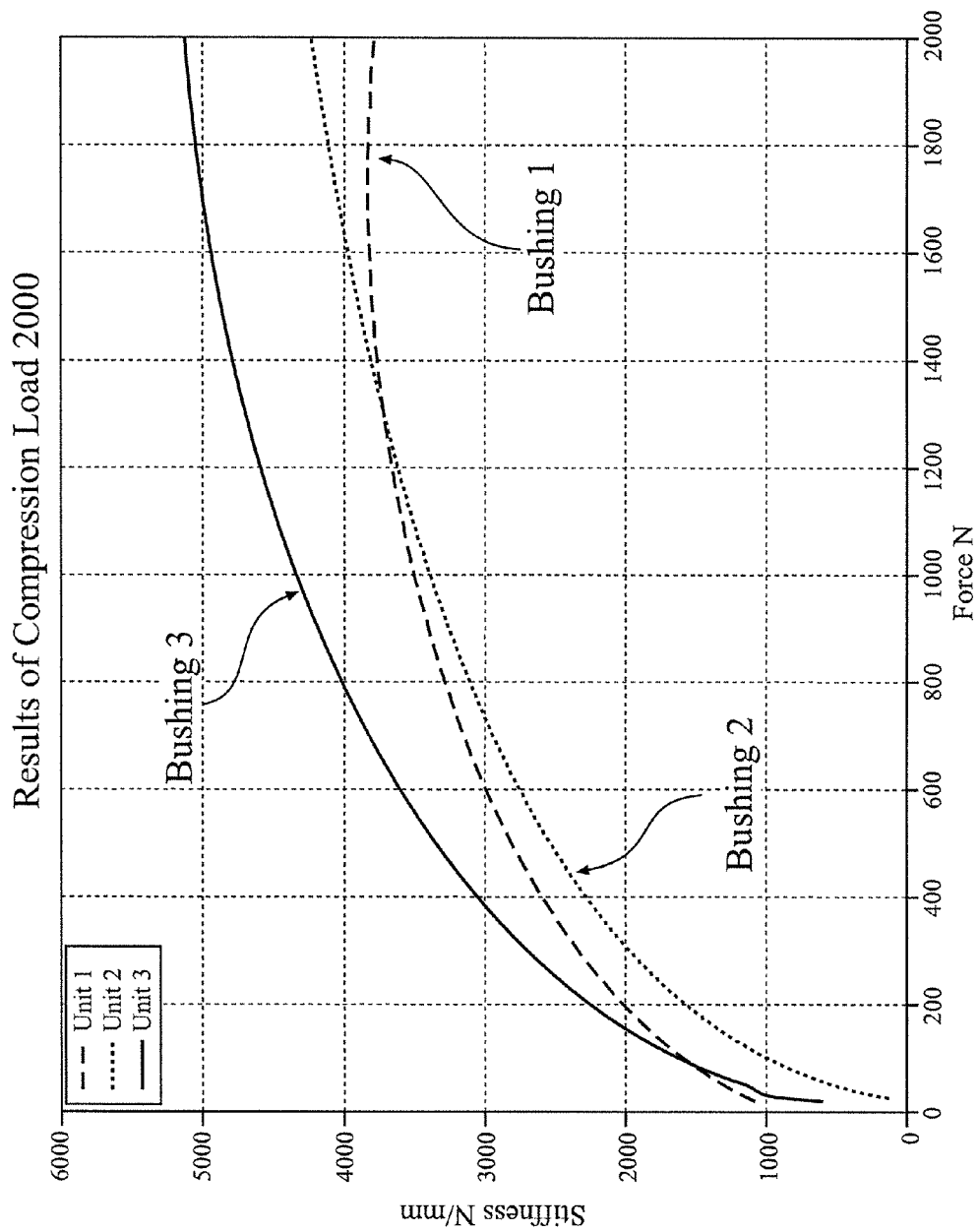
FIG. 8 provides stiffness curves associated with the three bushing designs depicted in Figure.
Figure 9:
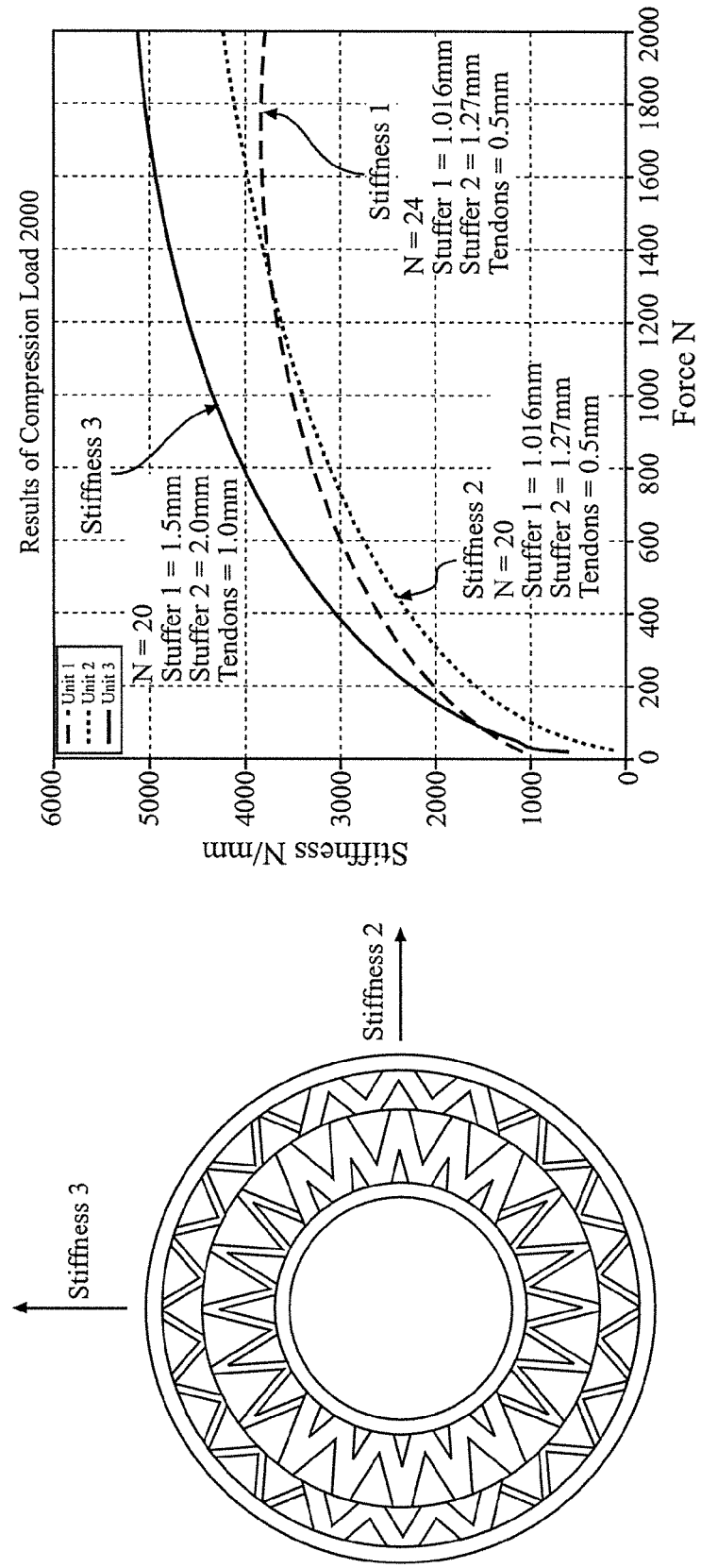
FIG. 9 plots stiffness along different directions in conjunction with changing stuffer and tendon dimensions.
Figure 10:
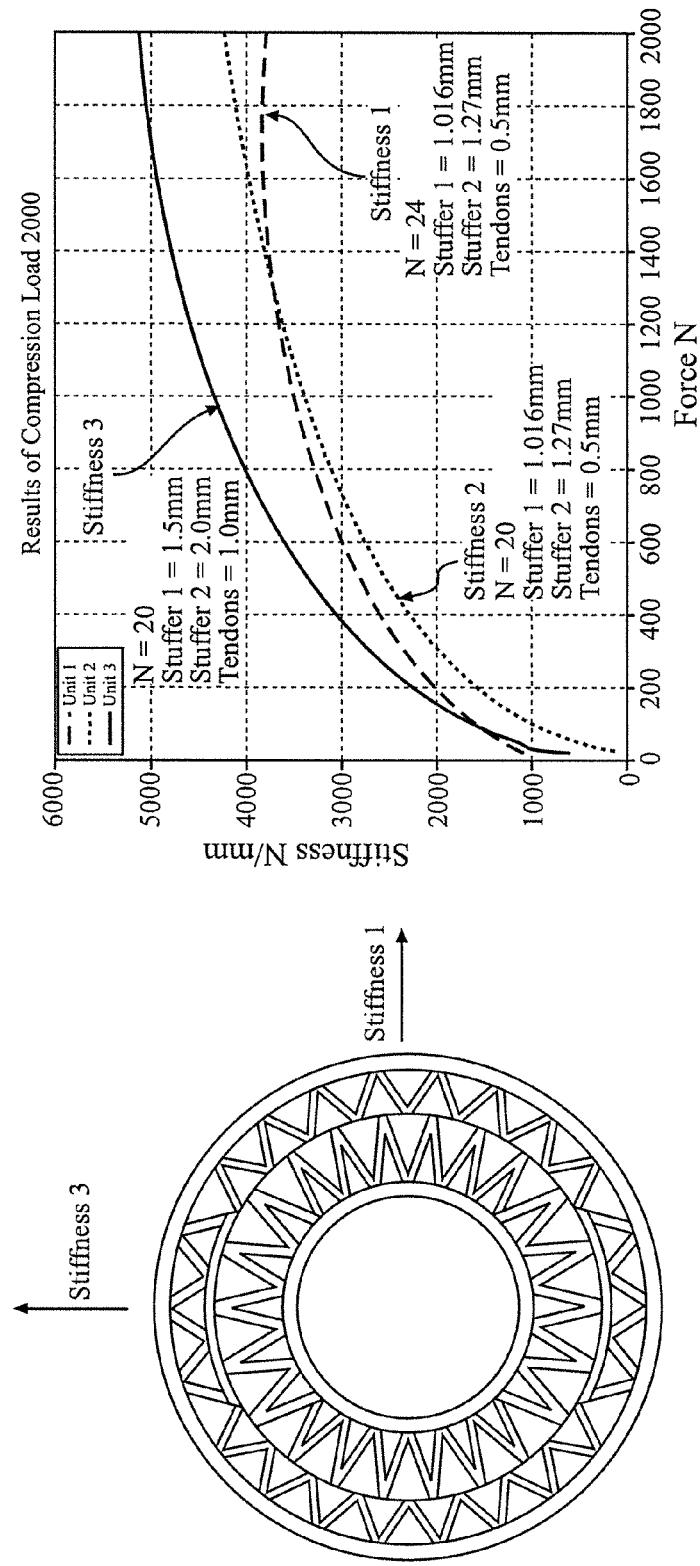
FIG. 10 plots stiffness along different directions as a function of periodicity N.
Figure 11:
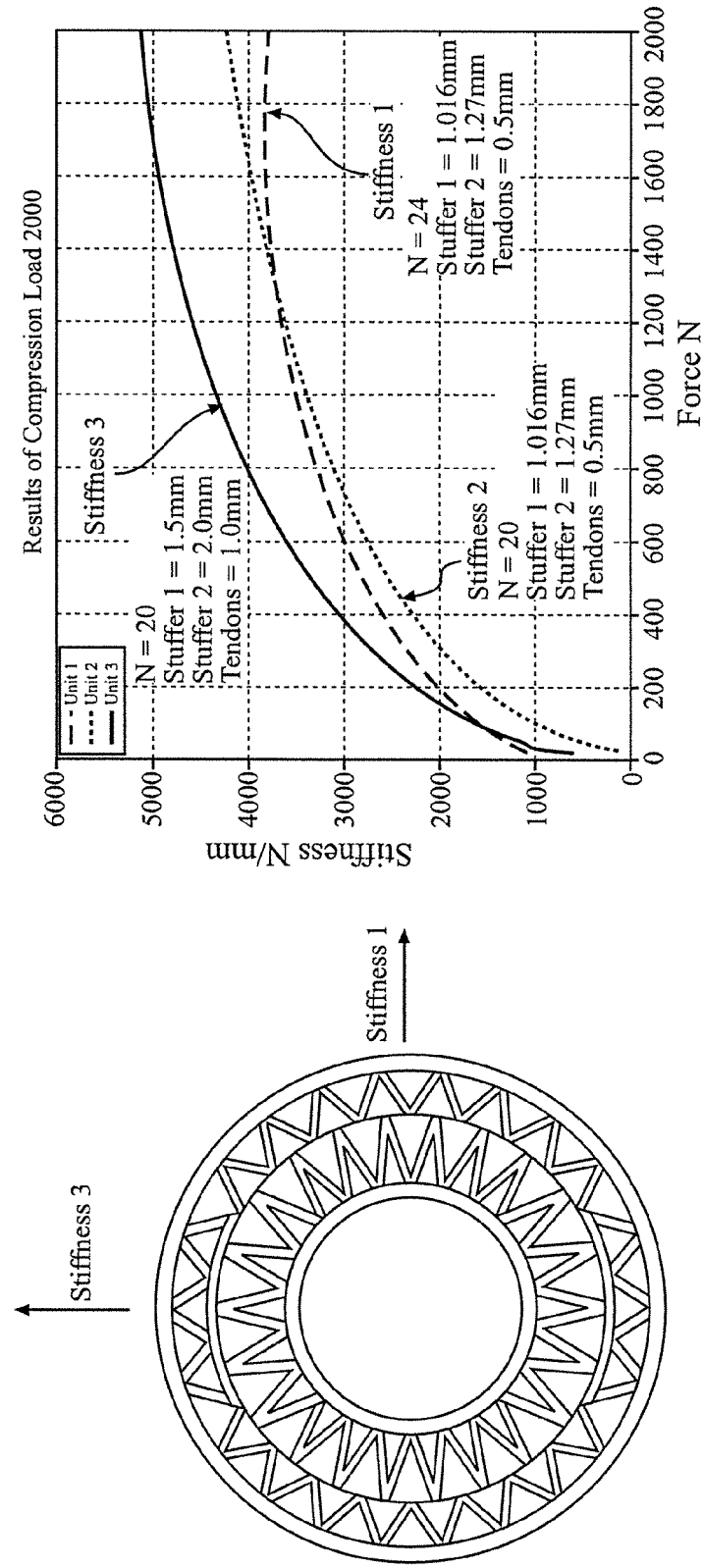
FIG. 11 plots stiffness along different directions by changing the periodicity of stuffer angles.

FIG. 8 provides stiffness curves associated with the three bushing designs depicted in FIG. 7. As expected, the design of bushing 3 is stiffer in response to an applied compressive load due to its incorporation of thicker stuffer and tendon members. Bushings 2 and three have stuffer and tendon members with the same cross sectional diameters but with a different number of units cells (20 vs. 24) radially around the structure. As such, their stiffness curves happen to intersect around 1300 N of applied force. FIG. 9 plots stiffness along different directions in conjunction with changing stuffer and tendon dimensions. FIG. 10 plots stiffness along different directions as a function of periodicity N, and FIG. 11 plots stiffness along different directions by changing the periodicity of stuffer angles.

Figure 12B:
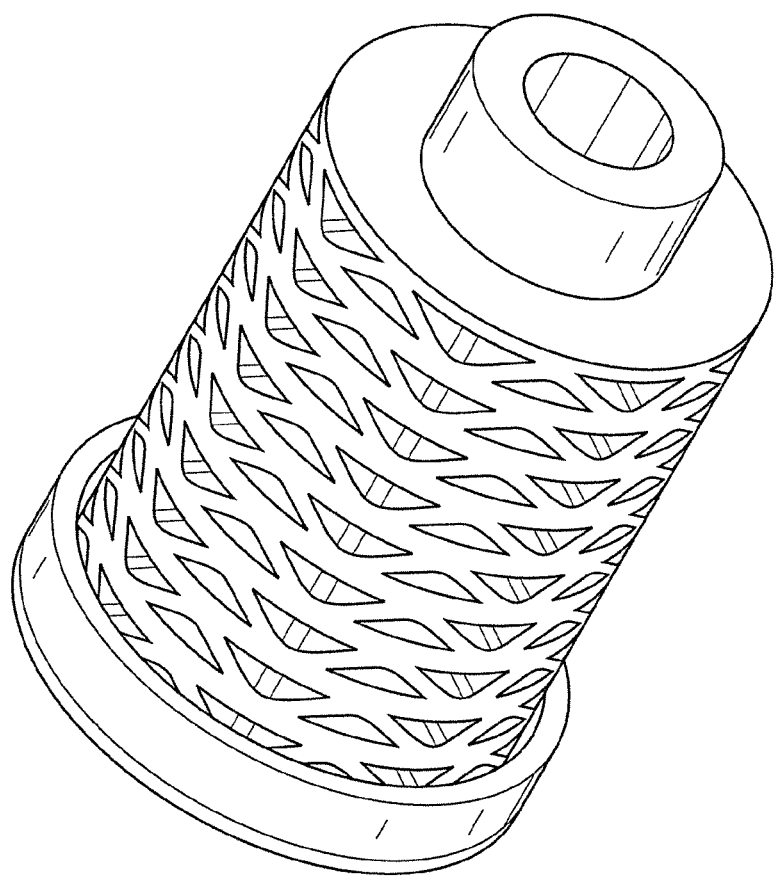
FIG. 12B is an oblique drawing of an NPR jounce bumper replacement.
Figure 12A:
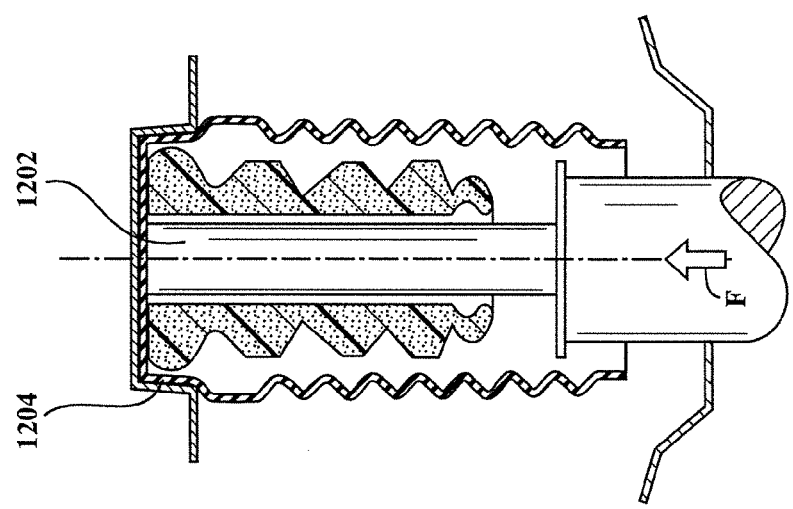
FIG. 12A is a simplified drawing in partial cross section depicting a jounce bumper assembly including an inside pin and a cup.

Whereas, in bushing configurations the nested V cells are stacked radially outwardly, in other devices, such as jounce bumpers, the cells are stacked lengthwise along the component. FIG. 12A is a simplified drawing in partial cross section depicting a jounce bumper 1200 assembly including an inside pin 1202 and a cup 1204. FIG. 12B is an oblique drawing of an NPR jounce bumper replacement for the structure of FIG. 12A, noting the same cup and pin may be used.

Figure 13:
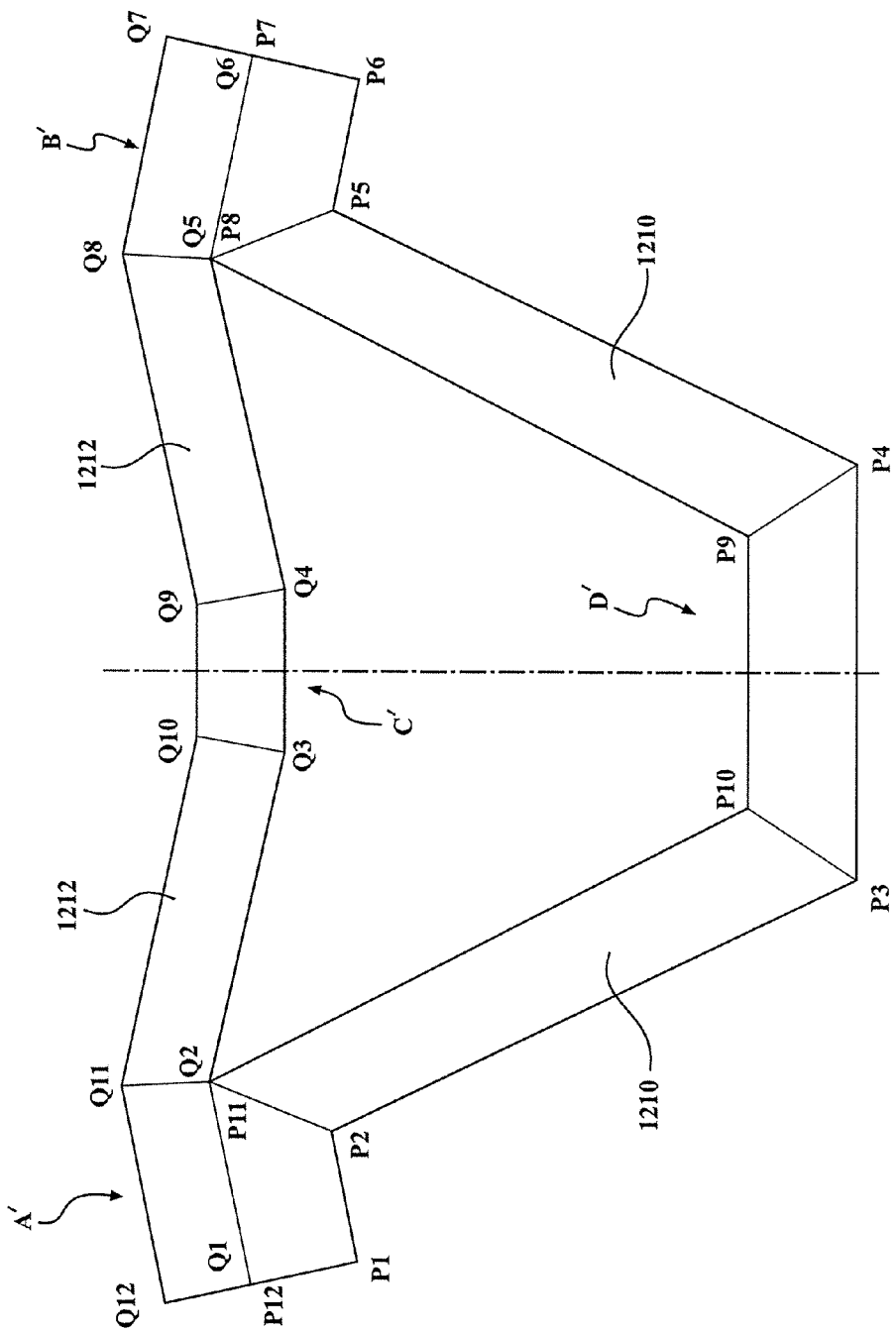
FIG. 13 is a drawing of a unit cell applicable to a jounce bumper embodiment of the invention.

FIG. 13 is a drawing of a unit cell applicable to a jounce bumper embodiment of the invention. As opposed to points, the regions A', B', C', and D' may include 'flats' enabling the unit cells to be glued, welded, or joined through any other appropriate technique. As with the busing embodiments disclosed herein, the stuffers 1210 may be composed of metal, ceramic, plastic, whereas the bands of tendon material 1212 may be more flexible, and may be made of natural or synthetic rubber or other resilient or deformable materials. In other embodiments, the stuffer and tendon materials may be the same and, indeed, the structures may be extruded.

Figure 14A:
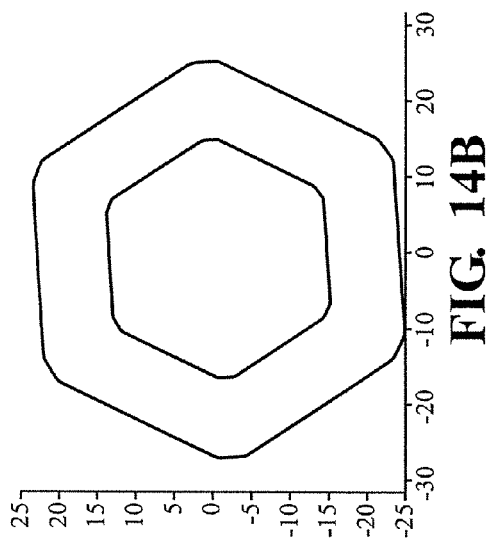
FIG. 14A is an on-axis view of a jounce bumper wherein 2 of the unit cells of FIG. 13 are stacked to create a 4-sided structure.
Figure 14B:
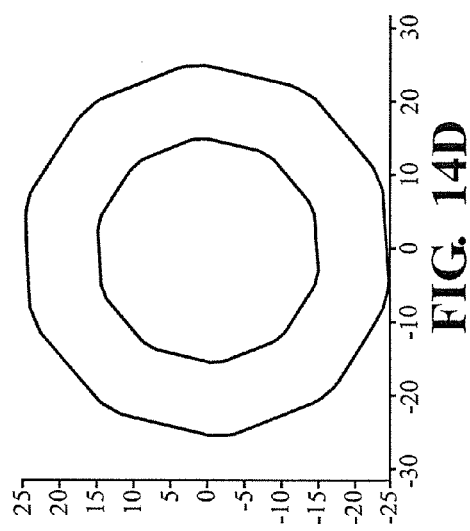
FIG. 14B is an on-axis view of a jounce bumper wherein 3 of the unit cells of FIG. 13 are stacked to create a 6-sided structure.
Figure 14C:
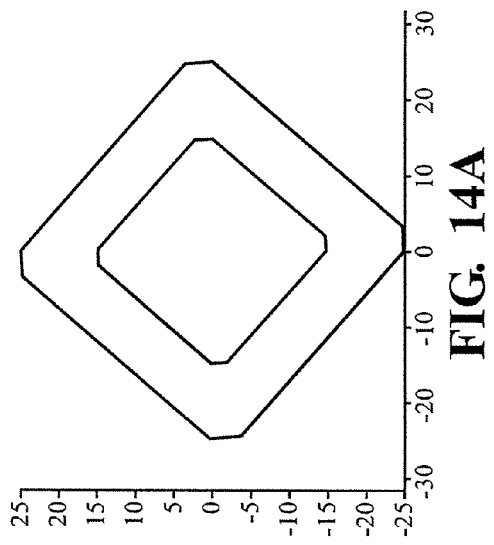
FIG. 14C is an on-axis view of a jounce bumper wherein 4 of the unit cells of FIG. 13 are stacked to create a 8-sided structure.
Figure 14D:
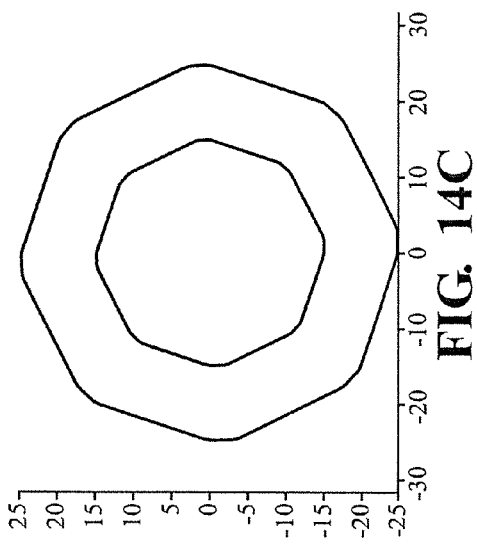
FIG. 14D is an on-axis view of a jounce bumper wherein 5 of the unit cells of FIG. 13 are stacked to create a 10-sided structure.

Using function-oriented design, the number of, dimensions, composition and/or shape of the tendons and stuffers in the bumper (and bushings) may vary lengthwise and/or radially outwardly to meet specific application criteria. FIG. 14A, for example, is an on-axis view of a jounce bumper wherein 2 of the unit cells of FIG. 13 are stacked to create a 4-sided structure; FIG. 14B is an on-axis view of a jounce bumper wherein 3 of the unit cells of FIG. 13 are stacked to create a 6-sided structure; FIG. 14C is an on-axis view of a jounce bumper wherein 4 of the unit cells of FIG. 13 are stacked to create a 8-sided structure; and FIG. 14D is an on-axis view of a jounce bumper wherein 5 of the unit cells of FIG. 13 are stacked to create a 10-sided structure.

The invention claimed is:

1. A NPR (negative Poisson's ratio) component, comprising:
   a tubular structure defining an axis, a length and a cross section;
   the structure being composed of a plurality of nested, double-V unit cells, each unit cell comprising a pair of side points A and B defining a width, a first pair of tensile members interconnecting points A and B and intersecting at a point C forming a first V shape, a second pair of stuffer members interconnecting points A and B and intersecting at a point D forming a second V shape;
   the unit cells being connected in a first direction with the point B of one cell being connected to point A of an adjoining cell, and so on, until completing a continuous band;
   the unit cells being further connected in a second direction with the point D of one cell being connected to point C of an adjoining cell; and wherein:
   the bands are stacked radially outwardly from the axis to form a bushing; or
   the bands are stacked lengthwise along the structure to form a joust bumper.

2. The NPR component of claim 1, wherein the tensile members are straight or curved.

3. The NPR component of claim 1, wherein the tensile members have a constant or variable cross section.

4. The NPR component of claim 1, wherein the stuffer members are straight or curved.

5. The NPR component of claim 1, wherein the stuffer members have a constant or variable cross section.

6. The NPR component of claim 1, wherein the tensile and stuffer members are composed of different materials.

7. The NPR component of claim 1, wherein the tensile and stuffer members are composed of different materials, with the tensile members being more flexible than the stuffer members.

8. The NPR component of claim 1, wherein the tensile members form part of one or more continuous sheets.

9. The NPR component of claim 1, wherein:
the tensile and stuffer members are composed of the same material; and
the component is molded or extruded.

10. The NPR component of claim 1, wherein the plurality of nested, double-V cells are attached to an inner, on-axis cylindrical sleeve.

11. The NPR component of claim 1, wherein the plurality of nested, double-V cells are attached to an outer, on-axis cylindrical sleeve.

12. The NPR component of claim 1, wherein the plurality of nested, double-V cells are attached to an outer, cup-shaped receptacle.

13. The NPR component of claim 1, wherein:
the number of unit cells within a band of unit cells is defined as periodicity; and
the periodicity is varied in accordance with an application.

14. The NPR component of claim 1, wherein:
the unit cells within a band of unit cells defines a height or a band of the ring; and
the height is the same or variable from band to band.

15. The NPR component of claim 1, wherein single, double, or multiple bands can be considered.

16. The NPR component of claim 1, wherein the first or second V-shapes within at least some unit cells define different angles.

17. The NPR component of claim 1, wherein the stuffer members, tensile members, or both, are constructed from metals, ceramics, rubbers, fiber-reinforced composite materials, polymer matrix materials, or plastics.

18. The NPR component of claim 1, further including a foam or other filler material between the stuffer and tensile members.

19. The NPR component of claim 1, wherein the cross section is circular or polygonal having an even number of sides.

20. The NPR component of claim 1, wherein the bottom of the V-shape can be flat or form a U-shape.

21. The NPR component of claim 1, wherein either or both tendon layer and stuffer layer can be a flat sheet or any curved sheet.

* * * * *